(12) United States Patent
Mader et al.

(10) Patent No.: US 8,012,543 B2
(45) Date of Patent: Sep. 6, 2011

(54) USE AND METHOD FOR REDUCTION OF CORROSION

(75) Inventors: Urs Mader, Frauenfeld (CH); Franz Wombacher, Jonen (CH); Beat Marazzani, Oberengstringen (CH)

(73) Assignee: Sika Technology AG, Baar (CH)

( * ) Notice: Subject to any disclaimer, the term of this patent is extended or adjusted under 35 U.S.C. 154(b) by 370 days.

(21) Appl. No.: 12/084,389

(22) PCT Filed: Nov. 3, 2006

(86) PCT No.: PCT/EP2006/068063
§ 371 (c)(1),
(2), (4) Date: Mar. 20, 2009

(87) PCT Pub. No.: WO2007/051833
PCT Pub. Date: May 10, 2007

(65) Prior Publication Data
US 2009/0218545 A1 Sep. 3, 2009

(30) Foreign Application Priority Data

Nov. 4, 2005 (EP) .................... 05110364

(51) Int. Cl.
*C07F 7/02* (2006.01)

(52) U.S. Cl. ............. 427/387; 528/28; 528/38; 528/33; 106/287.11; 106/14.15; 106/14.42; 428/447

(58) Field of Classification Search .................. 427/387; 106/287.11, 14.42, 14.15; 528/28, 33, 38
See application file for complete search history.

(56) References Cited

U.S. PATENT DOCUMENTS

| 6,174,461 B1 | 1/2001 | Miksic et al. |
| 6,251,989 B1 | 6/2001 | Edelmann et al. |
| 6,685,766 B2 * | 2/2004 | Standke et al. ............ 106/14.41 |
| 2003/0101898 A1 | 6/2003 | Standke et al. |

FOREIGN PATENT DOCUMENTS

| EP | 0 177 824 A2 | 4/1986 |
| EP | 1 308 428 A2 | 5/2003 |

OTHER PUBLICATIONS

Tomanek; "Silicone and Technick;" Ed. Wacker Chemie GmbH; 1990; pp. 24-25; Munchen, Germany.

* cited by examiner

*Primary Examiner* — Margaret G Moore
(74) *Attorney, Agent, or Firm* — Oliff & Berridge, PLC

(57) ABSTRACT

The invention relates to a use of a composition containing polyorganosiloxane S and a method of reducing corrosion on steel reinforcement in reinforced concrete constructions, and also a concrete structure which is produced using such compositions. It is highly suitable for the renovation of old concrete but also for inhibition of corrosion of reinforcing iron in fresh concrete.

20 Claims, No Drawings

USE AND METHOD FOR REDUCTION OF CORROSION

TECHNICAL FIELD

The invention relates to the field of corrosion inhibition of steel reinforcement in concrete constructions. In particular, the invention relates to the use of a composition comprising polyorganosiloxanes modified with amino alcohol for reducing corrosion on reinforcing steel of concrete constructions and also a method of reducing corrosion on reinforcing iron of concrete constructions.

PRIOR ART

Steel as reinforcement in construction works is widespread. Concrete-reinforcing steel is of particular importance. The steel is introduced into a hydraulically setting material and reinforces this. The steel is used, in particular, in rod-shaped form, in particular as rods or grids, and is frequently also referred to by those skilled in the art as reinforcing iron. Steel-reinforced concrete is of particular importance. Corrosion of steel present in hydraulically set materials is of great economic significance. Corrosion of the steel inlay reduces its strength and thus the strength of the concrete. Furthermore, the corrosion products such as iron oxides or hydrated iron oxides have a greater volume than the uncorroded steel itself. This results in stresses in the concrete which can lead to cracks or splitting-off of entire pieces.

Concrete constructions can be renovated by concrete being removed or blasted off from the surface and the steel reinforcement being exposed. The steel reinforcement can then, after removal of corrosion products by, for example, sand blasting, be treated with corrosion inhibitors or products containing corrosion inhibitors and finally covered again with concrete or a repair mortar, or reprofiled. This method is used particularly in cases of advanced corrosion of the reinforcing steel (in the case of a large decrease in cross section, this has to be replaced by new reinforcing steel) and spalling of the concrete and also when relatively high chloride concentrations are present in the layer of concrete covering the steel reinforcement. This procedure is very complicated and incurs considerable costs.

Addition of corrosion inhibitors such as nitrites, amines, alkanolamines, mixtures of these with inorganic or organic acids or phosphoric esters to fresh concrete or treatment of surfaces of cured steel-reinforced concrete with a penetrating corrosion inhibitor is known. However, to be able to display their action, the corrosion inhibitors have to penetrate through the concrete to the steel inlay. Depending on the thickness of the concrete covering the steel, this can be a distance of a number of centimeters and penetration takes a correspondingly long time. A considerable part of the applied amount of these corrosion inhibitors therefore does not reach the steel inlay at all and can accordingly not display a corrosion-inhibiting action. The inhibitors therefore have to be used in large amounts, which makes many steps necessary, and is uneconomical. Furthermore, amino alcohols are very volatile and frequently have a very strong odor, which is a disadvantage for application, in particular application over a large area.

It is also known that penetration of water into steel-reinforced concrete constructions can be prevented by suitable coatings based on silicon compounds and reactive resin coatings. EP-A-0 177 824 describes a hydrophobicizing agent comprising resin-like organopolysiloxanes and organic solvents and also sheet silicates. However, such coatings are hydrophobic but do not inhibit corrosion and have the disadvantage that they are easily damaged, e.g. mechanically or by UV rays or acid rain, which leads to chloride ions nevertheless being able to penetrate into the concrete over time and being able to lead to corrosion on the steel inlays.

EP-A-1 308 428 describes a composition based on alkylalkoxysilane or alkylalkoxysiloxane for reducing corrosion currents on steel reinforcement in concrete. In the silanes and siloxanes described, the Si atom is bound exclusively via Si-alkylene bridges, i.e. via an Si—C bond, to the substituent bearing an amino function. A solution of the corrosion inhibitor is applied or sprayed a number of times in succession onto the concrete surface, with the corrosion inhibitor penetrating into the surface. However, such a composition contains only a small concentration of corrosion inhibitor capable of migration. To obtain the desired corrosion-inhibiting action on the steel reinforcement, the composition therefore has to be applied in a very large amount and in a number of steps, which is uneconomical and very labor-intensive.

There is therefore a need for a composition for steel-reinforced concrete which can be applied to existing concrete structures and protects the steel against corrosion both quickly and in the long term and serves both to inhibit corrosion and to impregnate mineral building materials. In particular, there is a need for a composition which is storage stable and by means of which a corrosion inhibitor can be applied in high concentration to a concrete surface or be introduced into a concrete mix.

DESCRIPTION OF THE INVENTION

It is therefore an object of the present invention to provide compositions for reducing corrosion of steel reinforcement, which overcome the disadvantages of the prior art. It has surprisingly been found that this object can be achieved by use as claimed in the independent claims. In addition, such compositions have excellent processability and high stability.

These compositions comprising polyorganosiloxanes have the great advantage that they combine the properties of corrosion inhibition and hydrophobicization. Concrete treated therewith is hydrophobicized on the surface or in a layer close to the surface and, secondly, amino alcohol is eliminated and penetrates into the concrete and protects the reinforcing steel against corrosion. In particular, it has been found that this use is accompanied by strong hydrophobicization and large amounts of amino alcohol can be introduced in this way without precipitation of siloxanes or silanes occurring. Furthermore, these compositions allow the application of large amounts without large amounts of amino alcohols being released into the surrounding air during application. This is not possible when using the methods of the prior art. The method can thus be used both for the renovation of old concrete and also for the corrosion protection of reinforcing iron in fresh concrete.

Further advantageous embodiments of the invention are presented in the subordinate claims.

WAY OF CARRYING OUT THE INVENTION

The present invention relates to compositions and their use for reducing corrosion on steel reinforcement in steel-reinforced constructions.

The composition comprises at least one polyorganosiloxane S which has at least four repeating units of the general formula (I).

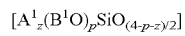 (I)

Here, $B^1$ is either H, an alkyl or aryl radical having up to 18 carbon atoms or a radical of the general formula (II)

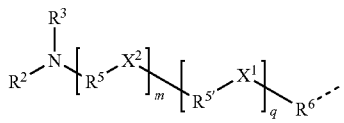

(II)

Furthermore, $X^1$ and $X^2$ are each, independently of one another, O, S or $NR^4$.

$A^1$, $R^2$, $R^3$ and $R^4$ are each, independently of one another, hydrogen or a hydrocarbon radical which contains up to 18 carbon atoms and can additionally contain heteroatoms selected from the group consisting of O, S, Si, Cl, F, Br, P and N.

Furthermore, $R^5$, $R^{5'}$ and $R^6$ are each, independently of one another, an unbranched or branched alkylene radical having from 1 to 8 carbon atoms.

In addition, z and p are each, independently of one another, 0, 1, 2 or 3. Furthermore, m is 0 or an integer from 1 to 10 and q is 0 or an integer form 1 to 10.

At least one radical of the general formula (II), at least one alkoxy or aryloxy radical having up to 18 carbon atoms and at least one repeating unit of the general formula (I) in which the silicon atom is bound to 3 oxygen atoms are present in the polyorganosiloxane S.

In all formulae in the present document, the silicon atom is tetravalent and broken lines symbolize the points of linkage to the other radicals.

If z or p is greater than 1, different radicals $A^1$ or $B^1$ can be present in each case.

Unlike the amino-functional silanes and siloxanes of the prior art in which the Si atom is bound via an Si—C bond to the substituents bearing the amino function, the radicals of the general formula (II) bearing the nitrogen function are bound to the silicon via an oxygen atom. This results in a dramatically altered reactivity of this bond, for example in respect of the hydrolyzability.

$A^1$ can be a hydrocarbon radical, preferably an aliphatic linear or branched or cycloaliphatic radical or phenyl radical. This preferably has from 1 to 10, in particular 1 or 8, carbon atoms. Particularly preferred hydrocarbon radicals are phenyl, n-butyl, isobutyl, n-propyl, isopropyl, ethyl, isooctyl, n-octyl and methyl radicals. $A^1$ is particularly preferably a hydrocarbon radical selected from the group consisting of methyl, n-octyl and isooctyl.

Hydrocarbon radicals $A^1$ which are likewise preferred are heteroatom-containing radicals which may have functional groups selected from the group consisting of a mercapto group, isocyanato group, where the isocyanato group may be reaction-blocked to protect it from chemical reactions, hydroxyl group, epoxy group, morpholino group, piperazino group, primary, secondary or tertiary amino groups having one or more nitrogen atoms, where the nitrogen atoms may be substituted by hydrogen or monovalent aromatic, aliphatic or cycloaliphatic hydrocarbon radicals, carboxyl group, carboxylic anhydride group, aldehyde group, urethane group, urea group, phosphonic monoester group, phosphonic diester group, phosphonic acid group, methacryloyloxy group, acryloyloxy group and mixtures thereof.

Hydrocarbon radicals $A^1$ which are likewise preferred have the formula —OC(=O)—$R^{10}$, where $R^{10}$ is a monovalent linear or branched aliphatic or cycloaliphatic hydrocarbon radical or a monovalent aromatic hydrocarbon radical, preferably a radical having from 1 to 18, in particular from 1 to 6, carbon atoms.

Preferred radicals $A^1$ containing an amino group have the general formula (V).

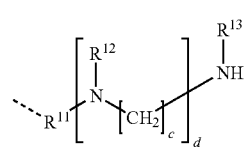

(V)

Here, $R^{11}$ is a divalent $C_1$-$C_{18}$-hydrocarbon radical, in particular a $C_2$-, $C_3$-, $C_4$-, $C_5$- or $C_6$-hydrocarbon radical, preferably a propylene radical.

$R^{12}$ and $R^{13}$ are each, independently of one another, a hydrogen atom or an unsubstituted or fluorine-, chlorine- or bromine-substituted $C_1$-$C_{18}$-hydrocarbon radical, preferably a $C_2$-, $C_3$-, $C_4$-, $C_5$- or $C_6$-hydrocarbon radical which may have cycloaliphatic or aromatic parts.

Furthermore, c is 2, 3, 4, 5 or 6, in particular 2, and d is 0 or 1, 2, 3 or 4, in particular 0 or 1.

$B^1$ can be an alkyl or aryl radical. Preferred alkyl or aryl radicals are aliphatic linear or branched or cycloaliphatic radicals bound via an oxygen atom to the silicon atom or phenyloxy radicals.

The radicals $B^1$ preferably have from 1 to 6, in particular from 1 to 3, carbon atoms. Particularly preferred radicals $B^1$ are ethyl or methyl.

$B^1$ can also be a radical of the formula (II).

In a preferred embodiment, $R^6$ is an ethylene, propylene, isopropylene or —C(CH$_3$)$_2$—CH$_2$— radical or a polyethylene or polypropylene radical. In particular, $R^6$ is an alkylene radical of the formula (III)

(III)

where n is an integer from 1 to 10, in particular from 1 to 4. n is particularly preferably 2.

In a preferred embodiment of the invention, m=q=0.

In a further embodiment, $R^2$ and/or $R^3$ are methyl, ethyl, isopropyl, n-propyl, isobutyl, n-butyl, isopentyl, n-pentyl or linear or branched hexyl, heptyl or octyl. Particular preference is given to methyl, ethyl or n-butyl.

In a further preferred embodiment of the invention, $R^2$ and/or $R^3$ are each H or a linear or branched aliphatic radical having from 1 to 12 carbon atoms, in particular methyl, ethyl, n-propyl, isopropyl, n-butyl, isobutyl, sec-butyl or tert-butyl. Particular preference is given to methyl, ethyl or n-butyl.

In a further preferred embodiment of the invention, $R^2$ is H and $R^3$ is a linear or branched aliphatic radical having from 1 to 12 carbon atoms, in particular methyl, ethyl, n-propyl, isopropyl, n-butyl, isobutyl, sec-butyl or tert-butyl. Particular preference is given to methyl, ethyl or n-butyl.

The at least four repeating units of the formula (I) can, independently of one another, be identical or different as long as the conditions formulated above for the polyorganosiloxane S are fulfilled.

The polyorganosiloxanes S can have further siloxane repeating units in addition to the four repeating units of the general formula (I). The further siloxane repeating units preferably contain radicals selected from the group consisting of hydrogen, hydroxyl, methyl and phenyl radicals.

Preferred polyorganosiloxanes S are ones which contain at least 0.5% by weight but not more than 60% by weight of radicals $OB^1$. Particular preference is given to polyorganosiloxanes S which contain at least 1% by weight but not more than 50% by weight, based on the weight of the polyorganosiloxane S, of radicals $B^1$. Preference is given to at least 70 mol %, in particular at least 90 mol %, of radicals $B^1$ in the polyorganosiloxane S being radicals of the general formula (II).

The molecular weights of the preferred polyorganosiloxanes S have a weight average molecular weight $M_w$ of from 500 to 5000 g/mol, particularly preferably from 600 to 3500 g/mol.

The preferred polyorganosiloxanes S comprise at least 10 mol %, in particular at least 50 mol %, of T units, where T units are ones in which the Si atom is bound to three oxygen atoms, regardless of whether the oxygen atom connects two Si atoms to one another or is part of a hydroxyl, alkoxy or aryloxy radical $OB^1$.

The further repeating units are preferably D units or M units, i.e. units in which the Si atom is bound to two oxygen atoms (D unit) or to only one oxygen atom (M unit).

The polyorganosiloxanes S can be obtained by reaction of polyorganosiloxanes C which contain hydrolyzable groups and are made up of at least four repeating units of the general formula (VI)

   (VI)

with an amino alcohol of the formula (VII)

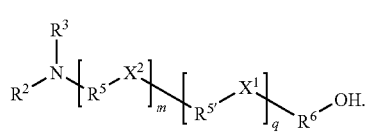   (VII)

Here, the radical $R^1$ is an alkoxy or aryloxy radical having up to 18 carbon atoms, a hydroxyl radical, H or a phosphonic acid radical or phosphonic ester radical bound via a $CH_2$ group to Si and the radicals $A^1, R^2, R^4, R^5, R^{5'}, R^6, X^1, X^2, p, z, m$ and $q$ are as defined above.

At least one alkoxy or aryloxy radical having up to 18 carbon atoms and at least one repeating unit of the general formula (VI) in which the silicon atom is bound to three oxygen atoms are present in the polyorganosiloxane C, but, in contrast to the polyorganosiloxane S, no radical of the general formula (II) is present.

Examples of suitable amino alcohols of the formula (VII) are polyoxyalkylenediols, in particular polyethylene glycols or polypropylene glycols, terminated with an amino group at one end;

polyoxyalkylene polyamines which are alkoxylated at one end, in particular as are obtained by monoalkoxylation of polyoxyalkylene polyamines which can be obtained, for example, under the trade name Jeffamine® from Huntsman Chemicals;

polyethylenimines which are alkoxylated at one end, in particular as are obtained by monoalkoxylation of polyethylenimines which can be obtained, for example, under the trade name Lupasol® from BASF;

addition products of ethylene oxide and/or propylene oxide started by means of ammonia or primary amine or secondary amine;

ethanolamine (2-aminoethanol), 3-aminopropanol, 1-amino-2-propanol, 2-amino-1-propanol (alaninol), 4-amino-1-butanol, 2-amino-1-butanol, 2-amino-2-methyl-1-propanol, 2-amino-2-methyl-1-propanol (AMP) and their N-alkylated or N-dialkylated derivatives;

2-(2-aminoethoxy)ethanol and its N-alkylated or N-dialkylated derivatives.

Preferred primary amino alcohols are ethanolamine, 1-amino-2-propanol, 2-amino-1-propanol, 2-amino-2-methylpropanol and 2-(2-aminoethoxy)ethanol.

Preferred secondary amino alcohols are N-methylethanolamine, N-methyl-1-amino-2-propanol, N-methyl-2-amino-1-propanol, N-methyl-2-(2-aminoethoxy)ethanol; N-ethylethanolamine, N-ethyl-1-amino-2-propanol, N-ethyl-2-amino-1-propanol, N-ethyl-2-(2-aminoethoxy)ethanol, N-butylethanol-amine, N-n-butyl-1-amino-2-propanol, N-n-butyl-2-amino-1-propanol, N-n-butyl-2-(2-aminoethoxy)ethanol.

Preferred tertiary amino alcohols are N,N-dimethylethanolamine, N,N-di-methyl-1-amino-2-propanol, N,N-dimethyl-2-amino-1-propanol, N,N-dimethyl-2-(2-aminoethoxy)ethanol, N,N,N'-trimethylaminoethylethanolamine, N,N-diethylethanolamine, N,N-diethyl-1-amino-2-propanol, N,N-diethyl-2-amino-1-propanol, N,N-diethyl-2-(2-aminoethoxy)ethanol, N,N,N'-triethylaminoethylethanolamine; N,N-di-n-butylethanolamine, N,N-di-n-butyl-1-amino-2-propanol, N,N-di-n-butyl-2-amino-1-propanol, N,N-di-n-butyl-2-(2-aminoethoxy)ethanol, N,N,N'-tri-n-butylaminoethylethanolamine, N,N,-dibutyl-N'-methylaminoethylethanolamine.

The polyorganosiloxanes C are compounds known to those skilled in the art and can be prepared in a known way, as is described, for example, in Andreas Tomanek, "*Silicone und Technik*", ed. Wacker Chemie GmbH, Carl Hanser Verlag, Munich, 1990, pp. 24-25.

The reaction of the polyorganosiloxane C with the amino alcohol of the formula (VII) preferably proceeds virtually to completion, i.e. virtually no unreacted amino alcohol is present in the reaction product. Bases such as alkoxides are typically used for the reaction. Elimination products formed in the reaction, for example alcohols, are preferably separated off from the reaction mixture by application of vacuum, if appropriate at elevated temperature, in order to achieve essentially complete reaction.

The composition can consist entirely of the polyorganosiloxane S or can contain further compounds.

Preferred further constituents are, in particular, firstly silanes and secondly hydraulically setting binders.

In one embodiment of the invention, the composition contains not only the polyorganosiloxane S but also at least one organosilane of the formula (IV)

   (IV)

Here, the radical $R^7$ is H or an alkyl or aryl radical having up to 18 carbon atoms or a radical of the formula (II). The radical $R^8$ is H or an alkyl or aryl radical having up to 18 carbon atoms and $A^2$ is a radical of the type which is possible for $A^1$. The radical $A^2$ can be identical to or different from $A^1$.

Finally, a is 0, 1 or 2. If a plurality of radicals $R^7$ are present (i.e. a≠2), these radicals can, independently of one another, be identical or different.

Organosilanes in which $A^2$ is an alkyl radical having from 3 to 12 carbon atoms, in particular from 5 to 9 carbon atoms, are particularly useful.

Preference is also given to organosilanes in which $R^7$ is methyl or ethyl or a radical of the formula (II).

Particular preference is given to organosilanes in which a is 0.

Preferred silanes of this type are pentyltrimethoxysilane, hexyltri-methoxysilane, octyltrimethoxysilane, isooctyltri-methoxysilane, decyltri-methoxysilane and dodecyltri-methoxysilane, in particular octyltrimethoxysilane and isooctyltrimethoxysilane, and also their ethoxy variants.

It has surprisingly been found that the addition of organosilanes, in particular those of the formula (IV), in particular ones in which $R^7$ is ethyl, to polyorganosiloxanes significantly improves the penetration of the corrosion inhibitor. In particular, it has been found that penetration occurs much more quickly. This is particularly advantageous when a plurality of wet-in-wet applications are carried out. It is additionally found that no or virtually no discoloration or darkening of the treated concrete surface compared to the untreated surface results. Thanks to the addition of organosilane, the concentration of polyorganosiloxane S and thus the concentration of amino alcohol which is eliminated on penetration can be matched in a simple manner to the requirements of the particular application.

Organosilanes having one or more radicals $R^7$ which are H or an alkyl or aryl radical having up to 18 carbon atoms are often widely available commercially or can be prepared in a simple manner from the corresponding methoxy derivatives (i.e. $R^7$=methyl), in particular by transesterification. Preferred silanes of this type are pentyltrimethoxysilane, hexyltrimethoxysilane, octyltrimethoxysilane, isooctyltrimethoxysilane, decyltrimethoxysilane and dodecyltrimethoxysilane, in particular octyltrimethoxysilane and isooctyltri-methoxysilane.

Organosilanes of the formula (IV) in which the radical $R^7$ is a radical of the formula (II) can be prepared by the same process as has been described above for the polyorganosiloxanes S. Here too, an alkoxyorganosilane (i.e. $R^7$=alkyl, in particular methyl) is typically transesterified by means of an amino alcohol. It is also advantageous here that the amino alcohol made available is reacted virtually completely. Depending on the amount of amino alcohol used, all or only part of the alkyl groups in dialkoxysilanes or trialkoxysilanes (a=0 or 1) can be replaced by radicals of the formula (II). The reaction products of octyltrimethoxysilane with aminoethanol are mentioned here by way of example:

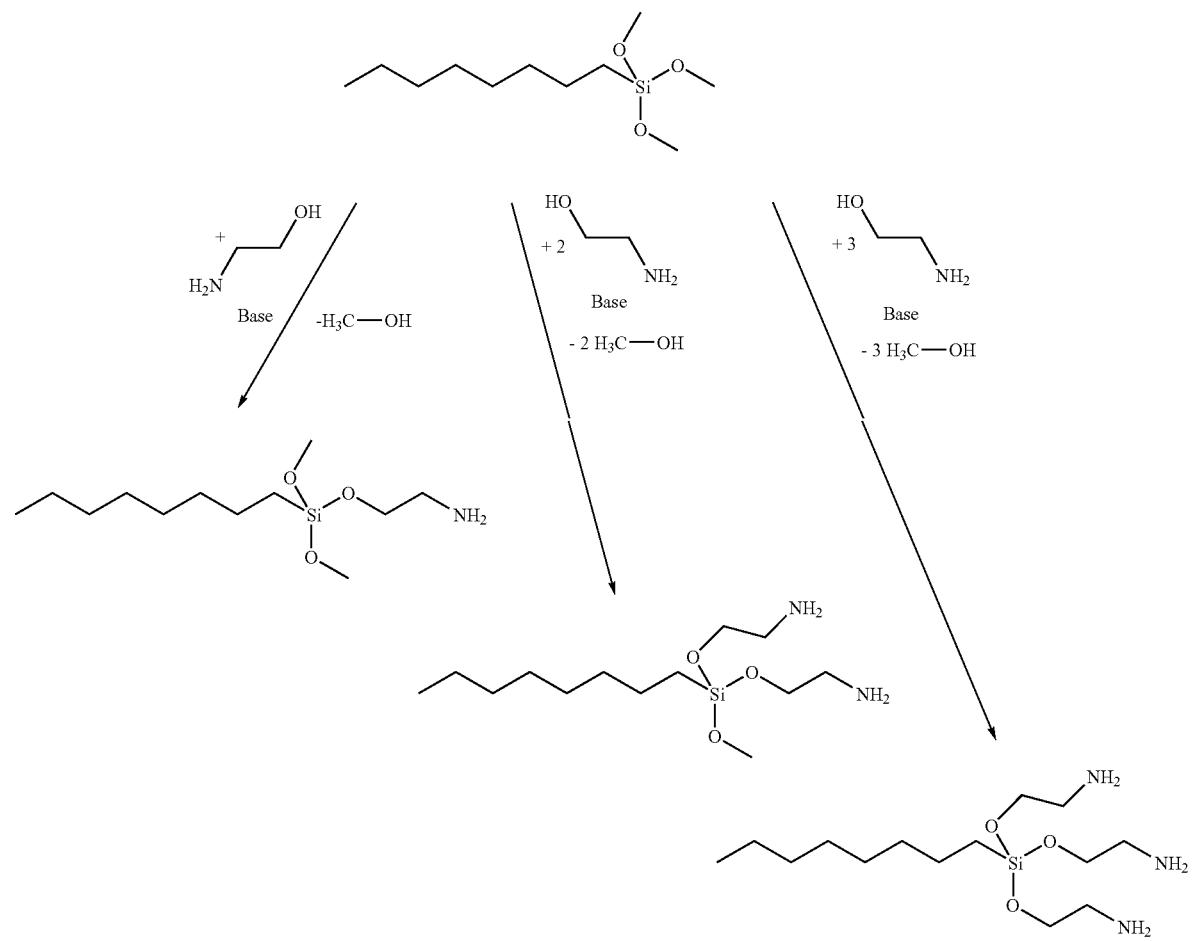

In a further embodiment of the invention, the composition contains not only the polyorganosiloxane S but also at least one hydraulically setting binder. The hydraulically setting binder is, in particular, a mineral binder such as cement, gypsum plaster, fly ash or slag, and also additives. Preferred hydraulic binders comprise at least one cement, in particular at least one cement in accordance with European standard EN 197 or calcium sulfate in the form of anhydrite or calcium sulfate hemihydrate or dihydrate; or calcium hydroxide. Preference is given to portland cements, sulfoaluminate cements and high-alumina cements, in particular portland cement. Mixtures of cements can lead to particularly good properties. For rapid curing, use is made of, in particular, rapid-setting cement-containing binders which preferably contain at least one high-alumina cement or another aluminate source, for example aluminate-supplying clinker, and, if appropriate, calcium sulfate in the form of anhydrite or calcium sulfate hemihydrate or dihydrate; and/or calcium hydroxide.

The composition can be present in low-viscosity to high-viscosity form, i.e. paste-like or gel-like form. The composition is preferably of low viscosity and penetrates readily. The composition preferably has a viscosity of from 1 to 100 mPas, particularly preferably from 1 to 50 mPas, more preferably from 1 to 20 mPas or from 5 to 10 mPas.

To improve the application properties, the composition can be formulated as a low- or high-viscosity emulsion or solution, depending on the use. For example, the composition can be added as aqueous emulsion or solution to the make-up water for the concrete in order to ensure very homogeneous distribution. For application to a steel-reinforced concrete surface, compositions which are sufficiently viscous to enable them to be applied in an amount of more than 100 g/m$^2$, in particular from 100 to 400 g/m$^2$, in few steps, preferably in one step, even to vertical surfaces without great product losses occurring due to running off are particularly suitable.

The composition can also contain additional components such as solvents, dyes, luminous materials, diluents, water, emulsifiers, thickeners, thixotropes, corrosion inhibitors or a mixture thereof. Particularly suitable solvents are alcohols, preferably methanol, ethanol, propanol, isopropanol, butanol, higher alcohols such as ethylene glycol, glycerol, polyether polyols such as polyethylene glycols and ether alcohols such as butyl glycol, methoxypropanol and alkylpolyethylene glycols, but also aldehydes, esters, ethers, amides or ketones, in particular acetone, methyl ethyl ketone, hydrocarbons, in particular methyl esters, ethyl esters, isopropyl esters, heptane, cyclohexane, xylene, toluene, white spirit and mixtures thereof. Suitable thickeners are, for example, finely divided clay minerals, precipitated silica or pyrogenic silica. Suitable corrosion inhibitors are, in particular, amino alcohols, in particular those of the formula (VII).

It has surprisingly been found that the above-described composition is highly suitable for application to concrete surfaces and penetrates well into the layers of concrete in which the steel reinforcement is usually present. Such a composition is therefore highly suitable for reducing or preventing corrosion of the steel reinforcement.

The present invention therefore provides for the use of the composition described for reducing corrosion on steel reinforcement of steel-reinforced concrete constructions.

In a further aspect, the invention provides a method of reducing corrosion on steel reinforcement of steel-reinforced concrete constructions, wherein the composition is preferably applied to a steel-reinforced concrete surface.

Application of the composition can advantageously be carried out by spraying, painting, squirting, pouring, brushing or rolling using, depending on requirements, an aid such as a brush, airless spraying apparatus, pressurized storage spraying apparatus, paint roller, spray can or the like. The composition is applied in an amount of from 50 to 2000 g/m$^2$, preferably 100-1000 g/m$^2$, more preferably 150-500 g/m$^2$, most preferably 200-300 g/m$^2$, to the steel-reinforced concrete surface. If appropriate, the composition is applied in a number of layers, preferably in two, three or four layers, especially when the desired amount of active substance cannot be applied in a single step because of a low absorbency of the substrate or the nature of the composition. In multiple application, a drying time between the steps can be necessary, with the drying time being able to be from minutes to a number of days, preferably in the range from half an hour to 24 hours, more preferably from 1 to 12 hours, particularly preferably from 2 to 5 hours.

In a further embodiment the present invention encompasses a method in which the composition is added to the fresh concrete, i.e. concrete which has not yet set. Here, the composition is preferably added to the make-up water for the concrete. The composition is preferably added in an amount of from 0.2 to 10% by weight, preferably from 0.5 to 5% by weight, more preferably from 1 to 3% by weight, based on the weight of the cement mix.

The present invention therefore likewise provides a hydraulically setting composition comprising the above-described composition, a hydraulic binder, in particular a mineral binder such as cement, gypsum plaster, fly ash or slag, and also additives. Preferred hydraulic binders comprise at least one cement, in particular at least one cement in accordance with European standard EN 197 or calcium sulfate in the form of anhydrite or calcium sulfate hemihydrate or dihydrate; or calcium hydroxide. Preference is given to portland cements, sulfoaluminate cements and high-alumina cements, in particular portland cement. Mixtures of cements can lead to particularly good properties. For rapid curing, use is made of, in particular, rapid-setting cement-containing binders which preferably contain at least one high-alumina cement or another aluminate source, for example aluminate-supplying clinker, and, if appropriate, calcium sulfate in the form of anhydrite or calcium sulfate hemihydrate or dihydrate; and/or calcium hydroxide.

As additives, it is possible to use any liquid or pulverulent concrete additives. The use of accelerators, plasticizers, thickeners, setting inhibitors, shrinkage reducers, antifoams, etc., is advantageous. Such additives such as setting accelerators or plasticizers, etc., are generally known. For spraying of concrete, accelerators as are marketed by Sika Schweiz AG, for example under the trade name Sigunit®, are particularly important. As plasticizers or setting inhibitors, it is possible to use, for example, those marketed by Sika Schweiz AG under the trade name Sika® ViscoCrete®.

The present invention further provides a concrete construction protected against corrosion of steel reinforcement, which has been treated by a method according to the invention. The concrete construction is advantageously an above-ground or underground engineering work, in particular a building or tunnel, a road or a bridge.

The polyorganosilane S can eliminate amino alcohol. If the composition described is applied to concrete, the polyorganosiloxane penetrates into the concrete. As a result of hydrolysis, the polyorganosiloxane S eliminates amino alcohol and can undergo condensation reactions. This forms a hydrophobic layer on the surface, in particular in a surface layer, of the concrete. The amino alcohol formed can penetrate further into the concrete, so that it is possible to reach reinforcing iron located deeper in the concrete and protect it against corrosion. The method described thus makes it possible to hydrophobicize the surface of reinforced concrete and at the same time protect the reinforcing steel against corrosion.

Finally, compositions containing polyorganosiloxane S also have, compared to compositions containing the corresponding amino alcohol in the appropriate concentration, workplace-toxicological and transport advantages, which can result in a more advantageous classification. During application, a smaller amount of volatile amino alcohols is given off into the surrounding air. This leads, in particular, to the additional advantage that odor pollution during application can be greatly reduced.

EXAMPLES

1. Compositions

The production of illustrative compositions containing polyorganosiloxanes S and comparative examples is described below. All percentages are by weight. Unless indicated otherwise, all procedures are carried out at room temperature (23° C.) and under atmospheric pressure (1013 mbar (abs.)). Apparatuses are customary laboratory apparatuses as are commercially available from numerous apparatus manufacturers.

Example 1: 1

Reaction of an isooctylmethylsilicone resin having a weight average molecular weight Mw of 1200 and 18% methoxy groups with trimethylaminoethylethanolamine:

600.00 g of the silicone resin and 1122.88 g of trimethylaminoethylethanol-amine are mixed under a blanket of nitrogen in a 2 l three-neck flask. The apparatus also has a reflux condenser and an internal thermometer. 0.86 g of sodium methoxide is added to the mixture. The mixture is heated to reflux (internal temperature of 112° C.). Reflux is maintained for 1 h. The mixture is then cooled and the reflux condenser is replaced by a distillation head. The mixture is distilled for 3 h under atmospheric pressure, resulting in the internal temperature increasing to 135° C. A vacuum of 60 mbar is then applied and distillation is continued under reduced pressure for a further 2 hours. This gives a slightly yellowish, clear, slightly viscous liquid having a slight intrinsic odor.

Yield: 634 g, viscosity: about 100 mPa*s (Brookfield viscometer (RVT), rotational viscometer having a defined shear rate, spindle no. 3, method based on DIN EN ISO 3219). The liquid remained stable over the entire storage time observed.

Characterization ($^1$H-NMR):

| | | |
|---|---|---|
| MeSiO$_{3/2}$ | 37.2 mol % | 21.7% by wt. |
| i-Octyl-SiO$_{3/2}$ | 10.5 mol % | 15.1% by wt. |
| MeOSi | 0.11 mol % | 0.02% by wt. |
| (CH$_3$)$_2$NCH$_2$CH$_2$N(CH$_3$)CH$_2$CH$_2$OSi | 42.3 mol % | 50.5% by wt. |
| Trimethylaminoethylethanolamine | 9.88 mol % | 12.6% by wt. |

Example 2: 2

Reaction of an isooctylmethylsilicone resin having a weight average molecular weight Mw of 1200 and 18% methoxy groups with N-methylethanol-amine:

254.94 g of the silicone resin are mixed with 245.06 g of N-methylethanolamine, and 0.25 g of sodium methoxide are added. The mixture is prepared under a blanket of nitrogen. The mixture is prepared in a 1 l single-neck round-bottom flask of a rotary evaporator. The charged flask is affixed to the rotary evaporator. A vacuum of 300 mbar is applied at the beginning and the oil bath is then heated to 110° C. When the oil bath temperature has reached 110° C., the vacuum is carefully lowered to 60 mbar. To keep the distillation going, the bath temperature is increased to 140° C. over the course of 2 hours. After 2 hours, no more distillate goes over. 305.87 g of a yellowish orange, clear, slightly viscous liquid having a slight intrinsic odor are obtained. Viscosity: about 100 mPa*s (Brookfield viscometer (RVT), rotational viscometer having a defined shear rate, spindle no. 3, method based on DIN EN ISO 3219). The liquid remained stable over the entire storage time observed.

Characterization ($^1$H-NMR):

| | | |
|---|---|---|
| MeSiO$_{3/2}$ | 40.0 mol % | 34.4% by wt. |
| i-Octyl-SiO$_{3/2}$ | 11.7 mol % | 24.8% by wt. |
| MeOSi | 0.59 mol % | 0.17% by wt. |
| CH$_3$NHCH$_2$CH$_2$OSi | 45.9 mol % | 38.9% by wt. |
| CH$_3$NHCH$_2$CH$_2$OH | 1.69 mol % | 1.63% by wt. |
| MeOH | 0.01 mol % | 0.01% by wt. |

Example 3: 3

Reaction of an octylmethylsilicone resin having a weight average molecular weight Mw of 1200 and 18% methoxy groups with N-butyl-ethanolamine:

266.70 g of the silicone resin are mixed with 400.00 g of N-butylethanolamine, and 0.33 g of sodium methoxide is added. The mixture is prepared under a blanket of nitrogen. The mixture is prepared in a 1 l single-neck round-bottom flask of a rotary evaporator. The charged flask is affixed to the rotary evaporator. A vacuum of 300 mbar is applied at the beginning and the oil bath is then heated to 110° C. When the oil bath temperature has reached 110° C., the vacuum is carefully lowered to 60 mbar. To keep the distillation going, the bath temperature is increased to 140° C. over the course of 2 hours. After 2 hours, no more distillate goes over. 406.26 g of a yellowish, clear, slightly viscous liquid having a slight intrinsic odor are obtained. Viscosity: about 150 mPa*s (Brookfield viscometer (RVT), rotational viscometer having a defined shear rate, spindle no. 3, method based on DIN EN ISO 3219). The liquid remained stable over the entire storage time observed.

Characterization ($^1$H-NMR):

| | | |
|---|---|---|
| MeSiO$_{3/2}$ | 32.8 mol % | 21.6% by wt. |
| i-Octyl-SiO$_{3/2}$ | 9.2 mol % | 14.9% by wt. |
| MeOSi | 0.03 mol % | 0.01% by wt. |
| CH$_3$(CH$_2$)$_3$NHCH$_2$CH$_2$OSi | 35.9 mol % | 38.1% by wt. |
| CH$_3$(CH$_2$)$_3$NHCH$_2$CH$_2$OH | 22.1 mol % | 25.4% by wt. |
| MeOH | 0 mol % | 0% by wt. |

Example 4: 4

A mixture of 50% by weight of example 3 and 50% by weight of isooctyl-trimethoxysilane was produced by combining the two liquids. The liquid remained stable over the entire storage time observed.

Example 5: 5

A mixture of 66.6% by weight of example 3 and 33.3% by weight of isooctyltrimethoxysilane was produced by combining the two liquids. The mixture has a slight intrinsic odor. The liquid remained stable over the entire storage time observed.

Example 6: 6

A mixture of 66.6% by weight of example 2 and 33.3% by weight of isooctyltrimethoxysilane was produced by combining the two liquids. The mixture has a slight intrinsic odor. The liquid remained stable over the entire storage time observed.

Example 7: 7

A mixture of 66.6% by weight of example 1 and 33.3% by weight of isooctyltrimethoxysilane was produced by combining the two liquids. The mixture has a slight intrinsic odor. The liquid remained stable over the entire storage time observed.

Example 8: 8

A mixture of 50% by weight of example 2 and 50% by weight of dipropylene glycol monomethyl ether was produced by combining the two liquids. The mixture has a slight intrinsic odor. The liquid remained stable over the entire storage time observed.

Example 9: 9

A mixture of 55.6% by weight of example 2 and 44.4% by weight of dipropylene glycol monomethyl ether was produced by combining the two liquids. The mixture has a slight intrinsic odor. The liquid remained stable over the entire storage time observed.

Reference Example 1: Ref. 1

100% by weight of isooctyltrimethoxysilane.

Reference Example 2: Ref. 2

A mixture of 98.49% by weight of isooctyltrimethoxysilane and 1.51% by weight of N-n-butylethanolamine was produced by combining the two liquids. The mixture has a distinct intrinsic odor. The liquid remained stable over the entire storage time observed.

Reference Example 3: Ref. 3

A mixture of 66.6% by weight of isooctyltrimethoxysilane and 33.3% by weight of N-n-butylethanolamine (stoichiometric, i.e. 50 mol %:50 mol %) was produced by combining the two liquids. The mixture has a very strong intrinsic odor.

Reference Example 4: Ref. 4

Protectosil® CIT, commercially available from Degussa.

2. Application Tests

The compositions were applied in the amount indicated in tables 1 and 2 to 3 year old concrete slabs by means of a brush.

The concrete slabs were produced using a concrete produced using the following constituents together with water:
11.25 kg of portland cement PC CEM 142.5 conforming to the standard EN 197-1
0.75 kg of limestone filler
24 kg of 0-1.2 mm sand
15 kg of 1.2-4.0 mm sand
11.25 kg of 4.0-8.0 mm sand
24 kg of 8.0-16.0 mm sand No concrete additives were used. The water/cement ratio (w/c ratio) was 0.64, the slump measured in accordance with the standard EN 12350-5 (1999) was 45 cm, the water conductivity $q_w$ measured in accordance with the standard SIA 162/1A (2003) was 3.8 $g/m^2h$, the water absorption coefficient w, measured in accordance with the standard DIN 52617 (mod. 1996), was 720+/−80 $g/m^2h^{0.5}$ and the air pore content measured in accordance with the standard EN 12350-7 (2000) was 3.6%. Concrete slabs having a size of 300×300× 80 mm were produced, stored at 20° C. and 95% relative atmospheric humidity for 28 days and subsequently exposed to weathering. The compressive strength after 28 days was 30.9 MPa. Before application of the compositions, the plates were sawn into two halves having a size of 300×148×80 mm. After rinsing with water, the slab-shaped test specimens obtained in this way were conditioned at 23° C. and 50% relative atmospheric humidity in a controlled-atmosphere room for about 2 weeks.

After application of the corrosion-inhibiting composition to the concrete test slabs, the specimens were exposed to weathering on a flat roof for one month and the discoloration of the concrete slabs, the water-repellent effect and the penetration behavior of the composition were subsequently analyzed.

Surface Hydrophobicization: Water-Repellent Effect

The effectiveness in repelling water dripped onto the surface was assessed by measuring the contact angle or wetting angle. Large contact angles of over 90° indicate good water-repellent effects, and medium to small contact angles of less than 90% tend to indicate poor water-repellent effects (table 1).

Hydrophobicization: Penetration Behavior

The penetration behavior of the hydrophobic compounds was determined by determining the thickness of the hydrophobic zone on the surface. For this purpose, a drill core (75 mm annular bit) was removed, the wall of the drilled hole in the concrete slab was dried and the wall was then wetted with water. The boundary line from wetting to absence of wetting by water could be seen clearly. The thickness of the unwetted, hydrophobic zone at the surface indicates the penetration depth of the hydrophobic compounds. As the penetration depth increases, the water absorption of the concrete decreases and at the same time its hydrophobicity increases.

TABLE 1

Determination of hydrophobic zone and water-repellent effect.

| | Examples | | | | | | |
|---|---|---|---|---|---|---|---|
| | 2 | 2 | 3 | 3 | 4 | 5 | 6 |
| Amount applied [g/m$^2$] | 175 | 250 | 175 | 250 | 300 | 300 | 300 |
| Surface discoloration | Whitish | Whitish | unch.* | unch.* | unch.* | unch.* | unch.* |
| Hydrophobic zone[mm] | <1 | <1 | <1 | 1 | 2 | 1-2 | 2 |
| Water-repellent effect Contact angle | large, >90° | large, >90° | medium, 45-90° | medium, 45-90° | medium, 45-90° | medium, 45-90° | medium, 45-90° |

*unch. = unchanged

Penetration Behavior of the Corrosion Inhibitor: Detection of Amino Alcohol by Means of the Ninhydrin Color Reaction The penetration behavior of the corrosion inhibitor was analyzed by determination of the depth profile, i.e. by determining the amino alcohol concentrations in various concrete layers on the test slabs, i.e. at a depth of 0-8 mm, 11-19 mm, 22-30 mm, 33-41 mm and 44-52 mm, by means of the ninhydrin color reaction (table 2).

The ninhydrin color reaction was carried out as follows: 1 g of crushed concrete sample from various layers of the concrete test slab was weighed into a tablet vial, and mixed with 1 ml of distilled water, shaken well and allowed to stand for 30 minutes. The liquid was filtered off through a 0.45 μm membrane filter. The extract was applied in an amount of 10 μl in a number of portions to a TLC plate (ready-to-use silica gel 60 F$_{254}$ TLC plates, 20×20 cm, Merck catalogue no. 105735) which had been activated at 120° C. in an oven for 2 hours. The plate was dried by means of a hairdryer between portions. After brief drying, the TLC plate was sprayed all over with a spray solution comprising 0.15 g of ninhydrin in 50 ml of butanol and 1.5 ml of glacial acetic acid (Merck reagent 231) and, after being dried briefly again, was sprayed with a spray solution comprising 0.1 g of ninhydrin in 50 ml of ethanol (Merck reagent 231). The TLC plate was subsequently developed at 120° C. for about 1 h in a drying oven until evaluation. To aid identification, a standard solution (100 ng of monoethanolamine/10 μl of H$_2$O) and a blank (distilled water) were also applied. A red spot on an orange background indicates that alkanolamine has been detected in the sample layer. In the case of the blank, no color reaction takes place. The red coloration was classified according to the intensity of the color as "very intense", "intense", "medium", "light", "trace" and "not detectable". The codings for this are indicated in table 2:

| | |
|---|---|
| Very intense: | 5 |
| Intense: | 4 |
| Medium: | 3 |
| Light: | 2 |
| Trace: | 1 |
| n.d.: | not detectable |

The detection of amino alcohol at a depth of 22-30 mm where the steel reinforcement is usually located is of particular interest.

The results in table 2 show that the reference examples Ref. 1 to Ref. 4 can introduce only small amounts if any of amino alcohols into the concrete. Examples 1 to 9 have a lower odor than the reference examples. In particular, reference example Ref. 3 which has an increased concentration of amino alcohol compared to examples 1 to 9 displays a dramatic difference in odor and volatility.

It has been found that the examples using polyorganosiloxane S and an organosilane (examples 4 to 7) display an extremely good penetration behavior.

Of course, the invention is not restricted to the examples presented and described. It goes without saying that the abovementioned features of the invention can be used not only in the combination indicated in each case but also in other modifications, combinations and variations or by themselves without going outside the scope of the invention.

TABLE 2

Depth profile analysis (detection of amino alcohol) by means of the ninhydrin color reaction.

| | Example | | | | | | | | | | | | | | | | | |
|---|---|---|---|---|---|---|---|---|---|---|---|---|---|---|---|---|---|---|
| | 1 | 1 | 1 | 2 | 2 | 2 | 2 | 3 | 3 | 4 | 5 | 6 | 7 | 8 | 9 | Ref. 1 | Ref. 2 | Ref. 4 |
| Storage time† [d] | 78 | 51 | 78 | 48 | 78 | 28 | 48 | 28 | 28 | 21 | 21 | 21 | 51 | 23 | 23 | 30 | 30 | 30 |
| Amount applied [g/m$^2$] | 175 | 250 | 250 | 175 | 175 | 250 | 250 | 175 | 250 | 300 | 300 | 300 | 300 | 300 | 300 | 300 | 540 | 540 |
| Depth profile | | | | | | | | | | | | | | | | | | |
| 0-8 mm | 4 | 4 | 3-4 | 3-4 | 4-5 | 4-5 | 3-4 | 5 | 5 | 5 | 5 | 5 | 4 | 5 | 5 | n.d. | 2 | 2 |
| 11-19 mm | 3 | 3 | 2-3 | 3 | 3-4 | 3-4 | 2-3 | 3 | 3 | 3 | 3-4 | 3 | 3 | 3 | 3 | n.d. | n.d. | n.d. |
| 22-30 mm | 1 | 1 | 1 | 3-2 | 3 | 3 | 1-2 | 2 | 2-3 | 2 | 3 | 2 | 1 | 2 | 2-3 | n.d. | n.d. | n.d. |

TABLE 2-continued

Depth profile analysis (detection of amino alcohol) by means of the ninhydrin color reaction.

| | Example | | | | | | | | | | | | | | | | | |
|---|---|---|---|---|---|---|---|---|---|---|---|---|---|---|---|---|---|
| | 1 | 1 | 1 | 2 | 2 | 2 | 2 | 3 | 3 | 4 | 5 | 6 | 7 | 8 | 9 | Ref. 1 | Ref. 2 | Ref. 4 |
| 33-41 mm | n.d. | n.d. | n.d. | 1 | 2 | 2-3 | 1 | 1-2 | 2 | 1 | 1-2 | 1 | 1 | 1-2 | 1-2 | n.d. | n.d. | n.d. |
| 44-52 mm | n.d. | n.d. | n.d. | n.d. | 1-2 | 1-2 | n.d. | 1 | 1 | n.d. | n.d. | n.d. | n.d. | 1 | 1 | n.d. | n.d. | n.d. |

†after application.

The invention claimed is:

1. A method for reducing corrosion on steel reinforcement of steel-reinforced concrete constructions comprising applying a composition to a steel-reinforced concrete surface or steel-reinforcement, or adding the composition to fresh concrete, wherein the composition comprises at least one polyorganosiloxane S having at least 4 repeating units of the general formula (I)

(I)

where $B^1$ is either H, an alkyl or aryl radical having up to 18 carbon atoms or a radical of the general formula (II)

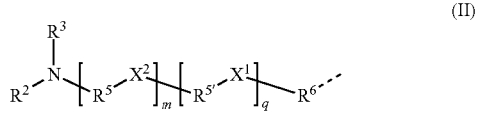

(II)

where $X^1$ and $X^2$ are each, independently of one another, O, S or $NR^4$;

$A^1$, $R^2$, $R^3$ and $R^4$ are each, independently of one another, hydrogen or a hydrocarbon radical which contains up to 18 carbon atoms and may additionally contain heteroatoms selected from the group consisting of O, S, Si, Cl, F, Br, P and N;

$R^5$, $R^{5'}$ and $R^6$ are each, independently of one another, an unbranched or branched alkylene radical having from 1 to 8 carbon atoms;

z and p are each, independently of one another, 0, 1, 2 or 3;

m is 0 or an integer from 1 to 10;

q is 0 or an integer from 1 to 10;

with the proviso that at least one radical of the general formula (II) and at least one alkoxy or aryloxy radical having up to 18 carbon atoms and at least one repeating unit of the general formula (I) in which the silicon atom is bound to three oxygen atoms are present in the polyorganosiloxane S, wherein at least 70 mol % of the radicals $B^1$ in the polyorganosiloxane S are radicals of the general formula (II).

2. The method as claimed in claim 1, wherein $R^6$ is an alkylene radical of the formula (III)

(III)

where n is an integer from 1 to 10.

3. The method as claimed in claim 2, wherein n is 2.

4. The method as claimed in claim 1, wherein $R^2$ and/or $R^3$ are each H or a linear or branched aliphatic radical having from 1 to 12 carbon atoms, in particular methyl, ethyl, n-propyl, isopropyl, n-butyl, isobutyl, sec-butyl or tert-butyl, preferably methyl, ethyl or n-butyl.

5. The method as claimed in claim 4, wherein $R^2$ is H and $R^3$ is a linear or branched aliphatic radical having from 1 to 12 carbon atoms, in particular methyl, ethyl, n-propyl, isopropyl, n-butyl, isobutyl, sec-butyl or tert-butyl, preferably , methyl, ethyl or n-butyl.

6. The method as claimed in claim 1, wherein $A^1$ is a hydrocarbon radical, in particular a hydrocarbon radical selected from the group consisting of methyl, n-octyl and isooctyl.

7. The method as claimed in claim 1, wherein the polyorganosiloxane S comprises at least 50 mol % of T units, where T units are units in which the Si atom is bound to three oxygen atoms.

8. The method as claimed in claim 1, wherein the proportion of radicals $OB^1$ in the polyorganosiloxane S is from 10 to 50% by weight.

9. The method as claimed in claim 1, wherein the composition additionally contains at least one organosilane of the formula (IV)

(IV)

where $R^7$ is H or an alkyl or aryl radical having up to 18 carbon atoms or a radical of the formula (II);

$R^8$ is H or an alkyl or aryl radical having up to 18 carbon atoms;

$A^2$ is a radical as is possible for $A^1$;

and a is 0, 1 or 2.

10. The method as claimed in claim 9, wherein $A^2$ is X—$R^9$---, where $R^9$ is a divalent organic radical which may contain heteroatoms selected from the group consisting of O, S, N and P;

X is H or a functional group selected from the group consisting of hydroxyl, epoxy, mercapto, amino, urethane, carboxyl, aldehyde, (meth)acryloyloxy.

11. The method as claimed in claim 1, wherein the composition additionally contains at least one hydraulically setting binder.

12. The method as claimed in claim 1, wherein the composition is applied to the steel-reinforced concrete surface.

13. The method as claimed in claim 1, wherein the composition is applied to steel reinforcement.

14. The method as claimed in claim 1, wherein the composition is added to fresh concrete.

15. A method of avoiding corrosion on steel reinforcement of steel-reinforced concrete constructions, wherein a composition is applied to a steel-reinforced concrete surface wherein the composition comprises at least one polyorganosiloxane S having at least 4 repeating units of the general formula (I)

(I)

where $B^1$ is either H, an alkyl or aryl radical having up to 18 carbon atoms or a radical of the general formula (II)

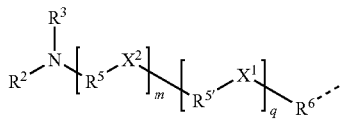
(II)

where $X^1$ and $X^2$ are each, independently of one another, O, S or $NR^4$;
$A^1$, $R^2$, $R^3$ and $R^4$ are each, independently of one another, hydrogen or a hydrocarbon radical which contains up to 18 carbon atoms and may additionally contain heteroatoms selected from the group consisting of O, S, Si, Cl, F, Br, P and N;
$R^5$, $R^{5'}$ and $R^6$ are each, independently of one another, an unbranched or branched alkylene radical having from 1 to 8 carbon atoms;
z and p are each, independently of one another, 0, 1, 2 or 3;
m is 0 or an integer from 1 to 10;
q is 0 or an integer from 1 to 10;
with the proviso that
at least one radical of the general formula (II) and
at least one alkoxy or aryloxy radical having up to 18 carbon atoms and at least one repeating unit of the general formula (I) in which the silicon atom is bound to three oxygen atoms are present in the polyorganosiloxane S, wherein at least 70 mol % of the radicals $B^1$ in the polyorganosiloxane S are radicals of the general formula (II).

16. The method as claimed in claim 15, wherein the composition is applied in a plurality of layers to the steel-reinforced concrete surface.

17. The method as claimed in claim 15, wherein the composition is applied by means of a brush or a color roller to the steel-reinforced concrete surface or is squirted or sprayed onto the surface.

18. The method as claimed in claim 15, wherein the composition is applied in an amount of from 50 to 2000 $g/m^2$, preferably 100-1000 $g/m^2$, more preferably 200-500 $g/m^2$, most preferably 250-300 $g/m^2$, to the steel-reinforced concrete surface.

19. A concrete construction treated by a method as claimed in claim 15.

20. The concrete construction as claimed in claim 19, wherein the concrete construction is an above-ground or underground engineering work, in particular a building, a road, a bridge or a tunnel.

* * * * *